3,042,972
PROCESS OF MANUFACTURING ARTICLES HAVING OUTER FOAMED PORTIONS
Gerald F. Lafferty, Beaver, Pa., assignor to Koppers Company, Inc., a corporation of Delaware
Filed June 24, 1960, Ser. No. 38,587
5 Claims. (Cl. 18—48)

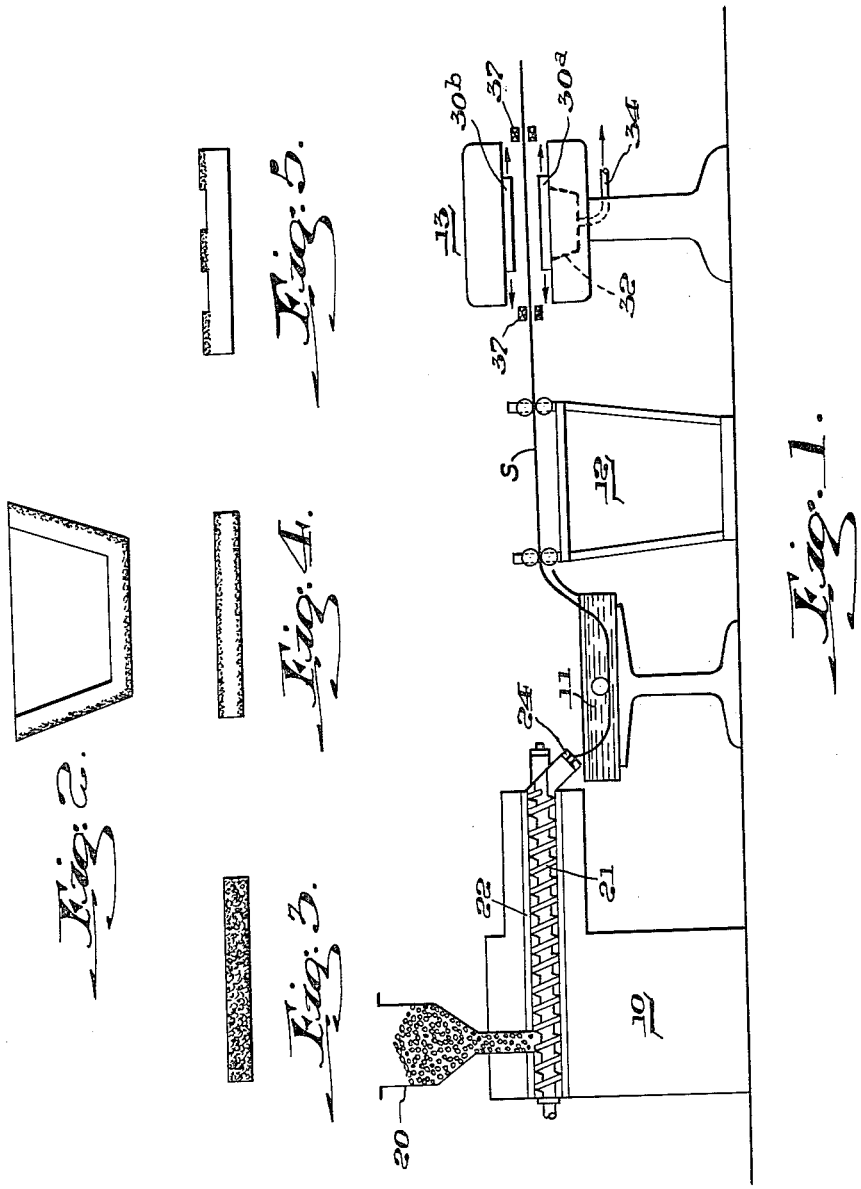

This invention relates to a novel process for producing shaped articles from plastic material and the products produced thereby, and more particularly to a process for producing shaped articles from unexpanded plastic material so that at least one side portion of the article has a foam structure.

Heretofore shaped articles that have at least one side portion with a foamed structure have been made by laminating a foamed plastic structure to a solid plastic structure and then thermoforming this laminated structure to the desired configuration.

Thermoforming is a basic method of shaping thermoplastic sheets and has been employed heretofore solely with either solid plastic material, with foamed plastic material, or with a laminate of solid and foamed material. One type of thermoforming known as vacuum thermoforming involves fastening a sheet of thermoplastic material on top of a mold, directing radiant heaters on one or both surfaces of the sheet until the sheet becomes soft and pliable, then drawing a vacuum in the enclosed mold cavity whereby the sheet in its elastic state is pressed by atmospheric pressure against the mold contours, cooling the sheet for a short period so that the sheet retains the shape of the mold, and then removing from the mold the shaped article. Thermoforming is conventionally used to produce shaped articles from materials such as high impact polystyrene, acrylonitrile-butadiene-styrene, acrylic sheeting, vinyl sheeting, polyethylene sheeting, cellulose-acetate-butyrate, etc. Such materials are useful for the production of commercial items such as containers for food and liquid, or as insulating materials for refrigeration.

It has now been discovered that articles having a foamed structure on at least one surface can be made and the foamed structure produced in a single thermoforming operation.

Heretofore, solid, prefoamed or laminated material had been used to make such articles having at least one portion as a foamed structure, by thermoforming; but none of the shaped articles thus made have the highly desirable combination of properties to be found in the products made by the process of this invention. These properties of the novel product of this invention include rigidity, thermal insulation, high surface glaze, improved moisture-vapor transmission properties, variegated surface appearance, and disposability after single use without any relatively great economic loss.

Several methods for making containers have been employed to take advantage of the insulating qualities of polystyrene foam. The production of articles of a foamed structure from expandable polystyrene beads, for example, such as those sold under the trade name Dylite has been carried out heretofore by placing the expandable polymeric beads in a mold and applying heat thereto, thereby causing the beads to expand and fuse to assume the shape of the mold. A shaped thermoplastic article made in this manner has excellent insulating properties, but it has the disadvantage that the cellular or aerated structure of such foam occurs on the surface thereof, giving the article a rough irregular surface that permits permeation of any liquid contained therein when liquid is allowed to remain in the article for a substantial length of time. Another disadvantage is that the cellular structure imparts a weakness to the shaped article, and whenever pressure is applied thereto, such as squeezing, the article tends to crack at the cell junctures. Shaped articles made in accordance with the process of this invention, however, have the desirable insulating properties of heat expanded fused particles without having the foregoing deficiencies.

Shaped articles have also heretofore been made by cutting and folding flat sheet stock of foamed structure into the desired form, but this presented the disadvantage that any pretreating of the surface of the sheet, as by ordinary coating methods, prior to forming, tends to break or weaken along the fold lines or creases during the forming operation. The folds and creases also tend to make the shaped article susceptible to leakage from liquids contained therein. The shaped articles produced in accordance with the process of this invention do not have the foregoing disabilities.

Articles produced in accordance with this invention have excellent rigidity and strength characteristics, and an article can be made that will contain liquids, such as beverages, for long periods of time without being permeated by the liquid. The articles produced by this invention also have a preferred characteristic, if desired, of a combination of two different types surfaces, such combination of two surfaces being obtained in a single operation without resolving to a laminating technique. In addition, the articles produced by the method of this invention have excellent thermal insulating properties. Most surprisingly, the articles can also be produced with the present market value of the materials used at such low cost that the articles can be disposed of after a single use without any relatively substantial economic loss. This novel process has the advantage of utilizing conventional thermoforming apparatus, both manual and automatic, to carry out the process.

This invention contemplates the production of articles having at least one portion in the nature of a foam structure by extruding an expandable polymeric material into sheet form without appreciable expansion taking place, heating this sheet in conventional thermoforming apparatus for a given period of time whereby at least one side of the sheet expands to a foam structure. If vacuum forming be used, the heated sheet is drawn into an enclosed mold cavity by vacuum so as to conform to the contours of the mold, and then cooled for a period of time to retain the conformed shape.

The foregoing and other objects, features and advantages of the invention will be more fully understood from the accompanying drawing when taken in connection with the following detailed description. It is to be understood that the drawing is for the purpose of illustration only and is not for the purpose of limitation of the invention.

In the drawing wherein like parts are marked alike:

FIG. 1 schematically illustrates an embodiment of apparatus useful in carrying out the process of the invention.

FIG. 2 is a section of a container made in accordance with the invention, wherein one side of the container has a foamed structure.

FIG. 3 illustrates a section of a container wherein the material has been completely foamed.

FIG. 4 illustrates a section of a container wherein the material in the outer surfaces has been foamed, but the inner core is unfoamed.

FIG. 5 illustrates a section of a container wherein the material in the surface has been intermittently foamed.

Turning now to FIG. 1, the novel process of this invention is illustrated as being carried out with conventional apparatus. As illustrated schematically in FIG. 1, such apparatus includes an extruder 10, a quench bath 11, take-off roll 12, and a thermoforming apparatus 13.

In carrying out the novel process of this invention, expandable polymeric material is fed into the hopper 20 of extruder 10. Such expandable polymeric material is commonly made by several manufacturers. One type of expandable polymeric material is sold under the trade mark Dylite by Koppers Company, Inc., and is generally comprised of polystyrene particles having incorporated therein from 3 to 15% of a low boiling aliphatic hydrocarbon such as petroleum ether, that boils below the melting point of the polystyrene. The expandable polymeric material flows from hopper 20 into the extrusion barrel 22 of extruder 10. As screw 21 forces the material through the extruder barrel it is heated by the mechanical action of the screw and by conventional heaters on the barrel surface (not shown) until it becomes a molten mass. This mass is forced through a die 24 as a sheet and is immediately passed into the quench bath 11 containing water maintained at about 55° F. and is cooled before any appreciable foaming can occur. The quenched sheet of polystyrene is then passed through take-off rolls 12. The size of die 24 and the dimensions of the sheets of course depend upon the structure which is to be made from the sheet. The foregoing method of producing a sheet of polymeric material which can be later expanded is described more fully in my copending U.S. application Serial No. 21,675, filed April 14, 1960, and assigned to the assignee of this invention. Reference is made to this copending application for further details of the process. Any of the materials described in my copending application may be used in the practice of this invention.

The material leaving the take-off table 12 is a solid sheet of polymeric material which is capable of expanding but has not been appreciably expanded. This material may be cut into desired lengths to make the article for final use. For purposes of simplicity, the sheet is shown as flowing from take-off table 12 to the thermoforming machine 13.

Thermoforming machine 13 may be of a conventional type. As illustrated herein, machine 13 is comprised generally of heating elements 30a and 30b, a mold of desired configuration 32, vacuum applying means 34 for causing the sheet to conform to the shape of the mold 32, and a clamping mechanism 37 for holding the sheet to the thermoforming machine.

In accordance with the present invention, the sheet of expandable polymeric material is placed over the mold 32 and held in place by clamping mechanism 37 actuated to hold the sheet in place. The one heater 34a is energized to apply heat to the sheet until the sheet reaches a limp condition. The heat also results in an expansion of the expanding agent in the sheet to produce a foam structure. The extent of production of foam structure will depend upon the temperature of the heater and the length of time that the sheet is exposed to the heat; the sheet will be heated partially through its thickness or completely through the thickness. In the embodiment illustrated herein the sheet is only partially heated through its thickness, for example, heated for about ten seconds by radiant heat that is about 850° F.

The sheet becomes pliable as a result of this heat. Thereafter, suction is applied by way of a line 34, drawing the sheet down into the mold 32 and forcing the sheet to conform to the contours of the mold. The sheet is then cooled off for a period of time, generally about five seconds, so that it can retain the shape of the mold. Thereafter the sheet is removed from the mold as a molded article.

In the embodiment illustrated herein, the mold 32 is cup shaped so that the molded article is a cup shaped container as shown in FIG. 2. Since only heater element 30a was used in this instance, the cup, as shown in cross section FIG. 2, has one side foamed and the other side unfoamed. Thus the inner edge of the cup, which contacts liquid, is a continuous solid film. The cross section ranges from this solid to foam structure through an integral, not sharply defined, area. Thus no problem of delamination exists in products made in accordance with this invention.

In another embodiment, both heater elements 30a and 30b are used to supply heat to the sheet held by the clamp 37 over the mold 32. In this embodiment both sides of the sheet were subjected to heat and were expanded uniformly. The cup then made in accordance with this embodiment had a uniform foamed cross-section as shown in FIG. 3.

In another embodiment, both heaters 30a and 30b were used to supply heat to the sheet, but the duration of the application of the heat was short so that only the upper and lower portions were heated to produce the foam structure, and the inner portion remained as a solid core. The cup was then formed as before, and a cross section through the cup had the general character as shown in FIG. 4.

In another embodiment one of the heaters, for example 30b, was operated intermittently so as to provide a foam structure only at a portion of the surface. This produced a product having a cross section as shown in FIG. 5.

While the foregoing has discussed the production of a container such as a cup it is obvious that many other shapes may be utilized for the production of other useful articles. In fact, the article need not be shaped but may be merely heated in accordance with this invention, in which event the article can have one or both surfaces foamed by applying heat to the surface to provide a cross-sectional area such as shown in FIGS. 3, 4 and 5.

Flat boards can be produced with the apparatus of FIG. 1 by not applying suction thereto. The advantage of the wall board made in accordance with this invention is that one surface being solid, acts as a vapor barrier, whereby the transmission of vapor or fluids is prevented and the possibility of any delamination, which was present heretofore, is eliminated. Further, when both sides are heated but the heating is not sufficient to completely foam the material, a board having the character as shown in FIG. 4 may be produced, whereby the board is insulated from both sides, but still retains the solid core which prevents the passage of vapor.

Another advantage of the use of the process of this invention in making articles is that by suitably controlling the amount, duration and time of heating decorative effects can be produced on the external surface, such external surface being shown in FIG. 5.

While the foregoing has described apparatus particularly using thermoforming with vacuum forming, it is obvious that other equipment may be used in this operation. For example, any thermoforming technique such as drape forming, plug-assist forming, drape-assist forming, air slip forming, plug and ring forming, pressure forming, match mold forming, and similar well known techniques may be used to produce the useful articles contemplated by this invention.

The sheet, when heated in accordance with this invention to a temperature such that the expanding agent becomes effective to cause expansion of the heated portion, changes its character. In the case of polystyrene, for example, it may change from a transparent sheet to a sheet having a white, translucent or an opaque structure. The foam portion, due to the expansion of the expanding agent, is a mass of closed cells within the sheet. When the sheet is heated on one side only, for example, the cells are larger toward the outer surface and become progressively smaller as they approach the inner unfoamed structure. The outer surface, however, remains as a continuous surface. The density of the sheet, for example in the case of polystyrene, may initially be 62.4 pounds per cubic foot, and depending upon the extent of foaming may thereafter be as low as one pound per cubic foot. In a typical case, for example where the sheet has been heated from both sides so that 85% of the cross-section consists of expanded cells and 15% consists of unexpanded material, the average cell size of the expanded portion is 0.25 mm. and the density is 9.1 pounds per cubic foot.

I claim:
1. A process for producing a shaped article which comprises heating at least one side of a sheet of thermoplastic resin which contains therein an expanding agent for creating a foam structure in the sheet when exposed to heat, the heating being continued until said sheet becomes of a limp character and only the portion of the sheet facing the heat source converts to a foamed structure, vacuum forming said sheet to a desired shape, cooling the shaped article to permit hardening and removing the cooled article from the shaping device.

2. The process of claim 1 wherein the heating is discontinued before the center of the sheet becomes sufficiently heated to develop a foamed structure whereby the resulting article has outer foamed areas and an inner unfoamed core.

3. The process of claim 1 wherein selected spaced apart portions of the surface are heated whereby said portions of the sheet are foamed.

4. A process for producing a container having an inner unfoamed surface and an outer foamed surface which comprises:
   (1) extruding, in the form of a sheet, a thermoplastic resin containing a normally liquid low-boiling, hydrocarbon,
   (2) immediately quenching said sheet at a temperature below that at which expansion will occur prior to any appreciable expansion,
   (3) clamping the unexpanded sheet above a male mold,
   (4) placing a heater over the sheet and heating for a timed interval to soften the sheet and to convert only the portion of the sheet facing the heat source to a foamed structure,
   (5) applying vacuum to conform the sheet to the contour of the mold,
   (6) cooling the mold and sheet to permit hardening, and
   (7) removing the formed plastic from the mold.

5. The process of claim 1 wherein said thermoplastic resin is polystyrene and said expanding agent is a hydrocarbon which boils within a range of from 9 to 90° C.

References Cited in the file of this patent

UNITED STATES PATENTS

| | | |
|---|---|---|
| 2,256,483 | Johnston | Sept. 23, 1941 |
| 2,442,940 | Staudinger et al. | June 8, 1948 |
| 2,942,301 | Price et al. | June 28, 1960 |
| 2,964,799 | Roggi et al. | Dec. 20, 1960 |

FOREIGN PATENTS

| | | |
|---|---|---|
| 817,981 | Great Britain | Aug. 12, 1959 |
| 582,122 | Canada | Aug. 25, 1959 |